(12) United States Patent
Hayashi

(10) Patent No.: US 7,773,470 B2
(45) Date of Patent: Aug. 10, 2010

(54) PICKUP CONTROL DEVICE, OPTICAL DISK APPARATUS AND PICKUP CONTROL METHOD FOR THE SAME

(75) Inventor: Yasuhiro Hayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 690 days.

(21) Appl. No.: 11/092,903

(22) Filed: Mar. 30, 2005

(65) Prior Publication Data
US 2005/0270951 A1   Dec. 8, 2005

(30) Foreign Application Priority Data
Mar. 31, 2004   (JP) ............... 2004-105482

(51) Int. Cl.
*G11B 7/00* (2006.01)
(52) U.S. Cl. .............. 369/44.34; 369/44.29; 369/47.32; 369/47.38; 369/47.48; 369/53.28
(58) Field of Classification Search ................. 364/118; 369/44.2, 44.3, 47.28, 47.38, 53.35, 53.14, 369/59.1, 44.27, 44.29, 44.32, 44.34, 44.35, 369/53.28, 47.32, 47.41, 47.43, 47.44, 47.45, 369/47.48, 53.13, 53.31, 53.36
See application file for complete search history.

(56) References Cited

U.S. PATENT DOCUMENTS

| | | | | |
|---|---|---|---|---|
| 4,286,318 A * | 8/1981 | Immink et al. | ............... | 700/78 |
| 4,412,161 A * | 10/1983 | Cornaby | .................... | 318/561 |
| 5,128,917 A * | 7/1992 | Kiyoshi | .................... | 369/44.32 |
| 5,138,594 A * | 8/1992 | Fennema et al. | ......... | 369/44.29 |
| 5,602,813 A * | 2/1997 | Furumiya | ................ | 369/47.32 |
| 6,137,753 A * | 10/2000 | Grimsley | ................ | 369/44.32 |
| 6,181,652 B1 * | 1/2001 | Katou et al. | ............ | 369/44.32 |
| 6,195,322 B1 * | 2/2001 | Ohtani et al. | ............ | 369/53.14 |
| 6,396,779 B1 * | 5/2002 | Fujiune et al. | ........... | 369/44.32 |
| 6,498,772 B1 * | 12/2002 | Fujiune et al. | ........... | 369/44.29 |
| 6,590,843 B1 * | 7/2003 | Zhuang | .................... | 369/44.32 |
| 6,683,833 B2 * | 1/2004 | Dekker et al. | ............ | 369/44.29 |
| 6,700,844 B2 * | 3/2004 | Na | .......................... | 369/53.14 |
| 6,765,848 B2 * | 7/2004 | Faucett | .................... | 369/44.32 |
| 6,813,227 B2 * | 11/2004 | Cho et al. | ................ | 369/44.28 |
| 6,958,966 B2 * | 10/2005 | Tateishi et al. | ............. | 369/53.3 |
| 7,215,608 B2 * | 5/2007 | Kim | ........................ | 369/44.32 |

(Continued)

FOREIGN PATENT DOCUMENTS

JP          9-35289          2/1997

*Primary Examiner*—William J Klimowicz
*Assistant Examiner*—Mark L Fischer
(74) *Attorney, Agent, or Firm*—Oblon, Spivak, McClelland, Maier & Neustadt, L.L.P.

(57) ABSTRACT

A pickup control device includes a servo system which processes a first signal for error control read from an optical disk to generate a servo control signal. A clock signal is synchronized with the rotation of the optical disk. Two memories store a frequency component at or lower than a predetermined frequency contained in the first signal and a rotational frequency component contained in the first signal. A first adder adds data from the first memory to the first signal and a second adder, in synchronization with the clock signal, data from the memories to generate a second signal. A correction unit writes into the second memory the frequency component or the rotational frequency component and reads data and supplies data to the first adder, and reads and updates data stored in the first memory.

23 Claims, 6 Drawing Sheets

U.S. PATENT DOCUMENTS

2002/0089906 A1* 7/2002 Faucett .................. 369/44.32
2003/0210621 A1 11/2003 Hayashi
2005/0128898 A1 6/2005 Hayashi et al.

* cited by examiner

PICKUP CONTROL DEVICE, OPTICAL DISK APPARATUS AND PICKUP CONTROL METHOD FOR THE SAME

CROSS REFERENCE TO RELATED APPLICATION

This application claims benefit of priority under 35USC§119 to Japanese Patent Application No. 2004-105482 filed on Mar. 31, 2004, the contents of which are incorporated by reference herein.

BACKGROUND OF THE INVENTION

1. Field of the Invention

The present invention relates to a pickup control device, optical disk apparatus and pickup control method for the same, and is directed, for example, to servo control for high-speed recording and reproduction of an optical disk.

2. Related Background Art

In recent years, as the speed of recording and reproducing of CD and DVD is increased, optical disk apparatuses in which the optical disk rotates at a rotational frequency close to the limit of the disk motor and pickup mechanism are being actively researched.

When an optical disk rotates at high speed, the effects of surface vibration and/or eccentricity, which are rotational components of the optical disk, become large. Accordingly, a rotation correction device is generally mounted on an optical disk apparatus.

With conventional rotation correction devices, however, before performing rotation correction, the level of disturbance signals produced during rotation must be once stored into a memory (calibration operation) without performing rotation correction. Therefore, the conventional rotation correction devices are not suitable for such cases as when a spindle motor whose rotational frequency changes gradually is controlled as with CLV control, or when data must be retrieved under a condition that high-speed rotation takes place suddenly.

More specifically, with the conventional control methods, in a control technique, such as CAV, where the rotational frequency is constant, correction operation using data once stored is possible in the whole range from the inner circumference to the outer circumference. However, in a control technique, such as CLV, where the rotational frequency changes gradually from the inner circumference to the outer circumference, if the calibration operation is not performed again, the rotation correction cannot be correctly performed. Also, when spindle-up is performed in the operation of drive etc., the rotational frequency increases gradually until high-speed rotation is achieved. Consequently, without performing a transition to the high-speed condition while updating the surface vibration data and/or eccentricity data stored in the memory, reproduction cannot be correctly performed. In either case, the correction of surface vibration and/or eccentricity must be stopped to perform calibration, thus involving a high risk of focus deviation or track jump taking place at this moment.

SUMMARY OF THE INVENTION

According to a first aspect of the invention, there is provided a pickup control device comprising:

a servo system which processes a first signal for error control read from an optical disk to generate a servo control-signal;

a clock signal generator which generates a clock signal synchronized with the rotation of the optical disk;

a first memory and a second memory each of which stores one of a frequency component at or lower than a predetermined frequency contained in the first signal and a rotational frequency component contained in the first signal;

a first adder which reads out data from the first memory to add the read data to the first signal;

a second adder which, in synchronization with the clock signal, retrieves data from the first memory and the second memory and adds those data to generate a second signal; and a correction unit which, in a first period, writes into the second memory the frequency component at or lower than the predetermined frequency or the rotational frequency component in synchronization with the clock signal, and at the same time reads out data stored in the first memory to supply the read data to the first adder, and in a second period after the first period elapses, reads data stored in the first memory in synchronization with the clock signal, and at the same time writes again into the first memory the second signal generated by the second adder to update data stored in the first memory.

According to a second aspect of the invention, there is provided an optical disk apparatus comprising:

a motor which rotates an optical disk;

an optical pickup which records information on the optical disk by radiating light on the rotating optical disk and reads information recorded on the optical disk from reflected light coming from the optical disk;

a pickup control device which includes a servo system which processes a first signal for error control read from an optical disk to generate a servo control signal and controls the optical pickup: and an optical pickup driver which adjusts the relative position between the optical pickup and optical disk based on a signal supplied from the servo system; the pickup control device further including:

a clock signal generator which generates a clock signal synchronized with the rotation of the optical disk;

a first memory and a second memory each of which stores one of a frequency component at or lower than a predetermined frequency contained in the first signal and a rotational frequency component contained in the first signal;

a first adder which reads out data from the first memory to add the read data to the first signal;

a second adder which, in synchronization with the clock signal, retrieves data from the first memory and the second memory and adds those data to generate a second signal; and a correction unit which, in a first period, writes into the second memory the frequency component at or lower than the predetermined frequency or the rotational frequency component in synchronization with the clock signal, and at the same time reads out data stored in the first memory to supply the read data to the first adder, and in a second period after the first period elapses, reads data stored in the first memory in synchronization with the clock signal, and at the same time writes again into the first memory the second signal generated by the second adder to update data stored in the first memory.

According to a third aspect of the invention, there is provided a pickup control method for use in an optical disk apparatus which performs recording and reproduction of an optical disk the optical disk apparatus having a first memory and a second memory, the pickup control method comprising:

generating a clock signal synchronized with the rotation of the optical disk;

storing one of a frequency component at or lower than a predetermined frequency contained in a first signal for error control read from the optical disk and a rotational frequency component contained in the first signal into a first memory and a second memory, respectively;

reading data from the first memory and adding the read data to the first signal; and retrieving data from the first memory and the second memory and adding those data in synchronization with the clock signal to generate a second signal, adding data to the first signal including writing the frequency component at or lower than the predetermined frequency or the rotational frequency component in synchronization with the clock signal into the second memory in a first period; and reading data stored in the first memory in synchronization with the clock signal in a second period after the first period elapses, and at the same time writing again the second signal into the first memory to update data stored in the first memory.

DETAILED DESCRIPTION OF THE INVENTION

Embodiments of the present invention will be described below with reference to the accompanying drawings.

(1) First Embodiment

Figure 1:
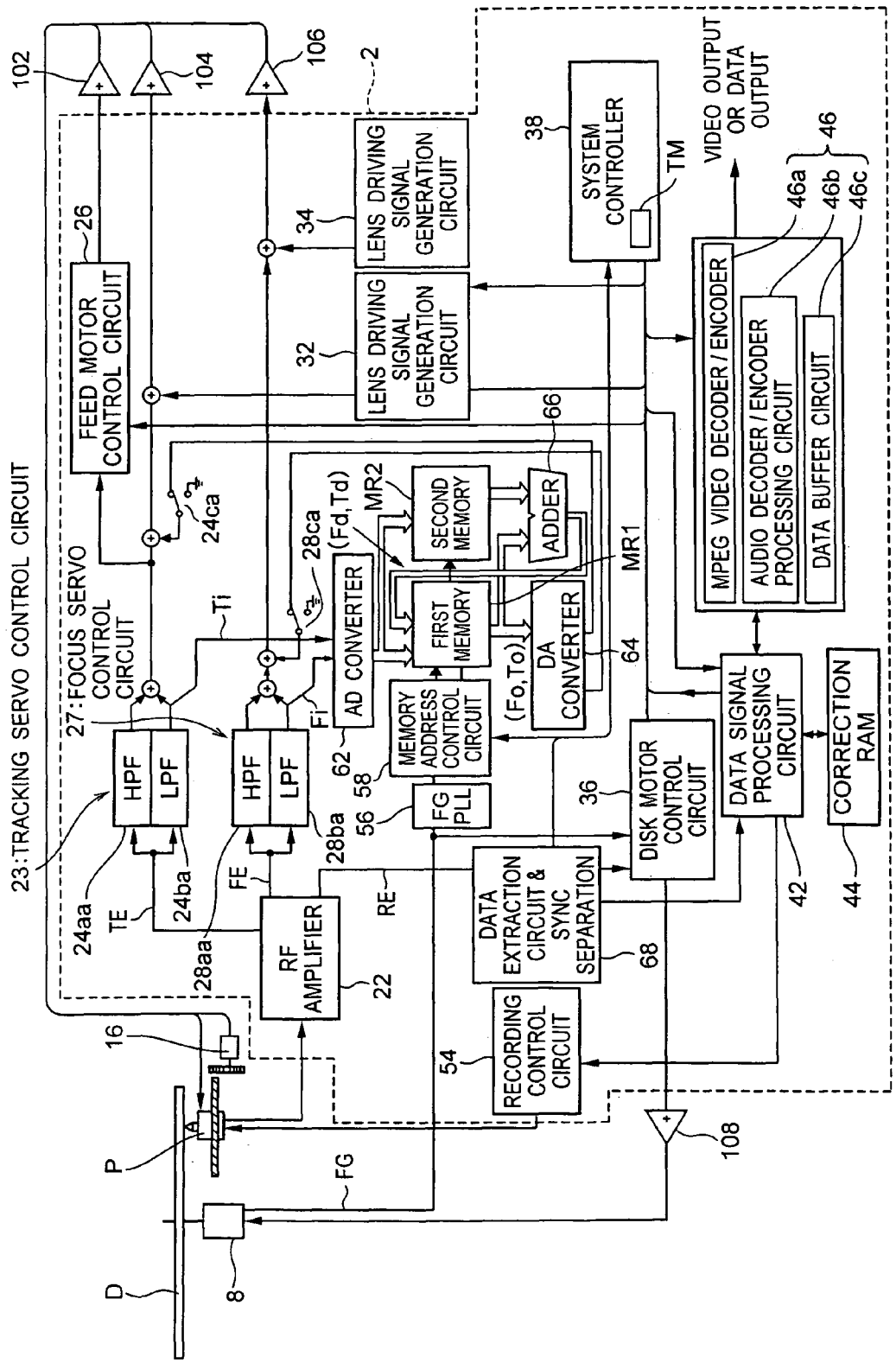
FIG. 1 is a block diagram schematically showing a configuration of an optical disk apparatus comprising a first embodiment of a pickup control device according to the present invention.

FIG. 1 is a block diagram schematically showing a configuration of an optical disk apparatus comprising a first embodiment of a pickup control device according to the present invention. A feature of the present embodiment is the generation of difference correction data, which is supplied to a servo system, by using: a second memory MR2 in which a low-frequency component (Fi, Ti) of the output signal from a servo control circuit is written as well as in a first memory MR1 (surface vibration/eccentricity memory); an adder 66 which adds the output data of the first memory MR1 to that of the second memory MR2 to write the resultant data again into the first memory MR1; and a memory address control circuit 58 which controls the above writing operations under the control of a system controller 38. The feature will be described later in detail.

Referring to FIG. 1, the optical disk apparatus comprises a disk motor 8 which rotates an optical disk D, an optical pickup P including a tracking actuator (not shown), a feed motor 16 which moves the optical pickup P, a pickup control device 2 of the present embodiment, and various types of drivers 102, 104, 106 and 108. The feed motor 16 corresponds to the optical pickup driver, for example.

The pickup control device 2 comprises an RF amplifier 22, a tracking servo control circuit 23, a focus servo control circuit 27, a feed motor control circuit 26, a data extraction circuit & sync separator 68, a data signal processing circuit 42, a recording control circuit 54, a correction RAM 44, a decoder/encoder processing circuit and data buffer circuit 46, the system controller 38, a disk motor control circuit 36, an FGPLL 56, a memory address control circuit 58, the first memory MR1, the second memory MR2, an AD converter 62, a DA converter 64, the adder 66, lens driving signal generation circuits 32 and 34, and switches 24ca and 28ca. The tracking servo control circuit 23 includes a tracking servo equalizer circuit having a high-pass filter HPF 24aa and a low-pass filter LPF 24ba. Similarly, the focus servo control circuit 27 includes a focus servo equalizer circuit having a high-pass filter HPF 28aa and a low-pass filter LPF 28ba. The decoder/encoder processing circuit and data buffer circuit 46 includes an MPEG video decoder/encoder processing circuit 46a, an audio decoder/encoder processing circuit 46b, and a data buffer circuit 46c. The adder 66 corresponds to the second adder, for example.

The RF amplifier 22 is connected to the optical pickup P. The RF amplifier 22 is also connected to the tracking servo control circuit 23, focus servo control circuit 27 and data extraction circuit & sync separator 68. The tracking servo control circuit 23 is connected to the actuator driver 104 and to the feed motor control circuit 26 which is connected to the motor driver 102. The focus servo control circuit 27 is connected to the actuator driver 106. The drivers 102, 104 and 106 are connected to the feed motor 16 and optical pickup R The data extraction circuit & sync separator 68 is connected to the system controller 38, disk motor control circuit 36, and data signal processing circuit 42. The data signal processing circuit 42 is also connected to the recording control circuit 54, system controller 38, decoder/encoder processing circuit and data buffer circuit 46, and correction RAM 44. The recording control circuit 54 is connected to the optical pickup P. The system controller 38 includes a timer TM which counts a clock signal to be described later. The system controller 38, which is also connected to the decoder/encoder processing circuit and data buffer circuit 46, disk motor control circuit 36, memory address control circuit 58, feed motor control circuit 26 and lens driving signal generation circuits 32 and 34, controls the control timings of each control circuit and the operation of the entire device. The system controller 38 can also retrieve the information on address on optical disk from the output signal of the CD/DVD data signal processing circuit 42. The term "address on optical disk" means logical address inserted into the data in the case of a disk having some data written therein, and means physical address on optical disk in the case of a non-recorded disk with no data written therein. The lens driving signal generation circuit 32 is connected to the actuator driver 104 via a wire connecting the tracking servo control circuit 23 to the actuator driver 104. The lens driving signal generation circuit 34 is connected to the actuator driver 106 via a wire connecting the focus servo control circuit 27 to the actuator driver 106. The disk motor control circuit 36 is connected to the disk motor 8 via the disk motor driver 108. The disk motor 8 is connected to the FGPLL 56 which is connected to the memory address control circuit 58. The memory address control circuit 58 corresponds to the correction unit, for example. The memory address control circuit 58 is connected to the first memory MR1 and second memory MR2, whereby the second memory MR2 is subject to the same address control as the first memory MR1.

A signal read out from the optical disk D by the pickup P is amplified by the RF amplifier 22. At the same time, a tracking error signal TE, a focus error signal FE, and an RF signal being information signal are extracted from the amplified signal.

The tracking error signal TE is supplied to each of the filters 24aa and 24ba of the tracking servo control circuit 23, whereby the gain and phase are compensated, and a seek control etc. are also performed. When a track jump operation is performed, a signal outputted from the lens driving signal generation circuit 32 is added to the output of the tracking servo control circuit 23. The output signal thus obtained is supplied to the actuator driver 104 to drive the tracking actuator (not shown) of the pickup P. The output of the tracking servo control circuit 23 is also sent to the feed motor control circuit 26 to drive the feed motor 16 via the motor driver 102.

The focus error signal FE is supplied to each of the filters 28aa and 28ba of the focus servo control circuit 27. After passing through the above filters, the focus error signal FE is added to an output signal of the lens driving signal generation circuit 34 during focus search. The resultant signal is sent to the actuator driver 106 to drive the focus actuator (not shown) of the pickup P.

In the reproduction system, the RF signal is sent to the data extraction circuit & sync separator 68, and is binarized in the data extraction circuit. At the same time, bit clock and sync signal are extracted. Then the binarized signal is sent to the CD/DVD data signal processing circuit 42. Herein, data obtained by reading out data recorded on the disk is demodulated and subjected to the correction process using the correction RAM 44. The sync signal is sent to the disk motor control circuit 36 and used for the disk motor control via the disk motor driver 108. With CAV control, signal FG from the disk motor 8 is supplied to the disk control circuit 36. In the case of DVD movie, data corrected by the data signal processing circuit 42 is sent to the MPEG video decoder/encoder 46a or audio decoder/encoder processing circuit 46b, whereby video signal or audio signal is outputted. In the case of DVD-ROM, the output data of the data signal processing circuit 42 is sent to the data buffer circuit 46c and sent therefrom as digital data to a host personal computer or the like.

In the recording system, the operation of the servo control system is approximately similar to that of the reproduction system. In this case, however, an analog signal is supplied to the MPEG video decoder/encoder 46a or audio decoder/encoder processing circuit 46b in the case of DVD movie, whereby encoded video data or audio data is outputted. In the case of data recording DVD drive, data sent from a host personal computer or the like is stored in the data buffer circuit 46c. In the CD/DVD data signal processing circuit 42, parity bit addition process using the correction RAM 44, and scrambling process and modulation process are applied to the above data. The output data thus obtained is sent to the recording control circuit 54, in which a drive signal is generated by pulse modulation process for recording data on the optical disk. The drive signal is sent to the optical pickup P, whereby laser beam is modulated in a pulsed manner.

The FGPLL circuit 56 generates a clock synchronized with multiplied FG based on signal FG outputted from the disk motor 8. The FGPLL circuit 56 corresponds to the clock signal generator, for example. Recently, hall motors are used in many optical disks; signals from the hall sensor within the motor are extracted as signal FG, so the number of poles per rotation is small in most cases. Accordingly, in order to increase the resolution in the rotational direction, a high-frequency multiple clock synchronized with FG is generated by the FGPLL circuit 56. Based on this same clock, the memory address control circuit 58 controls the data memory MR1 and data memory MR2. Since these data memories are controlled by use of the clock based on signal FG, data can be written or read out in synchronization with the rotation.

The tracking servo control circuit 23 is composed of the high-pass filter HPF 24aa and low-pass filter LPF 24ba; the outputs of each of the filters are combined. As described later, a signal from the DA converter 64 is added to the output signal of the circuit 23 via the switch 24ca. Added to the resultant signal is a signal for performing track jump supplied from the lens driving signal generation circuit 32. The signal thus obtained is supplied to the actuator driver 104.

Similarly to the tracking servo control circuit 23, the focus servo control circuit 27 is also composed of the high-pass filter HPF 28aa and low-pass filter LPF 28ba; the outputs of each of the filters are combined. As with the tracking servo control circuit 23, a signal from the DA converter 64 is added to the output signal of the circuit 23 via the switch 28ca, as described later. Added to the resultant signal is a signal for performing focus search operation supplied from the lens driving signal generation circuit 34. The signal thus obtained is supplied to the actuator driver 106.

Figure 2:
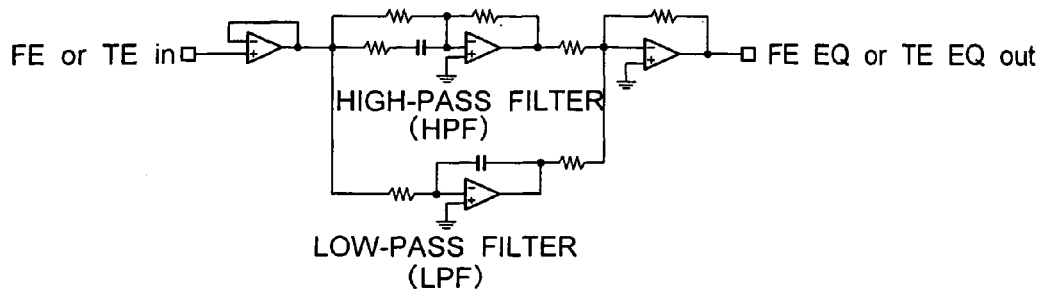
FIG. 2 is a diagram showing an example of a specific configuration of a tracking servo control circuit or focus servo control circuit contained in the optical disk apparatus shown in FIG. 1.

An example of a specific configuration of the tracking servo control circuit 23 and focus servo control circuit 27 is shown in FIG. 2.

The low-pass filter LPF 24ba of the tracking servo control circuit 23 is connected to the AD converter 62; the low-pass filter 28ba of the focus servo control circuit 27 is similarly connected to the AD converter 62. The AD converter 62 is connected to the first memory MR1 and the second memory MR2. The first memory MR1 is connected to the DA converter 64 as well as to the adder 66. The second memory MR2 is also connected to the adder 66. The adder 66 is connected to the first memory MR1. The DA converter 64 is connected to the switches 28ca and 24ca; its output is selectively added to the tracking servo system and the focus servo system. The switches 28ca and 24ca correspond to the first adder, for example.

The first memory MR1 has a function similar to that of conventional surface vibration/eccentricity memories, and can store surface vibration and/or eccentricity data with respect to each of the focus system and tracking system. On the other hand, the second memory does not always need to have separate data for the focus system and tracking system.

Figure 3:
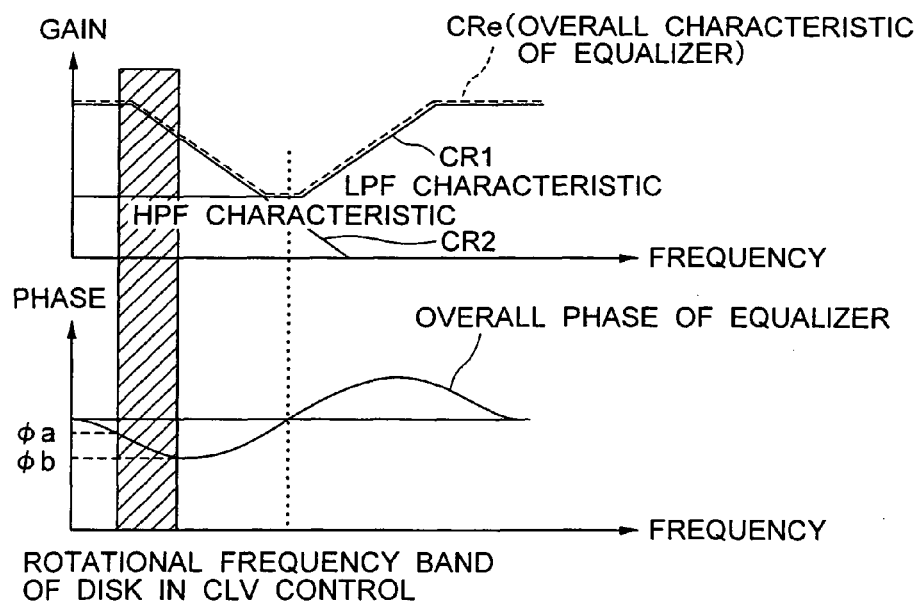
FIG. 3 is a diagram showing equalizer characteristics of the pickup control device shown in FIG. 1.

FIG. 3 is a diagram showing equalizer characteristics of the tracking servo control circuit 23 and focus servo control circuit 27. LPF characteristic CR2 and HPF characteristic CR1 are added to each other; thus the overall characteristic is represented by a broken line CRe. The rotational frequency of optical disk must fall into the frequency band of the LPF characteristic. While the overall characteristic is obtained by adding the LPF characteristic and HPF characteristic, it can be seen from the drawing that the phase of the rotational frequency band (shaded portion of FIG. 3) is delayed. In the case of CLV rotation control, the rotational frequency gradually changes from the inner circumference to the outer circumference; in the drawing, the frequency changes continuously from the right part to the left part of the shaded portion. The frequency change width is approximately 2.5 times for CD or DVD disk having a diameter of 12 cm. Referring to FIG. 3, the phase of the equalizer characteristic also changes significantly from φb to φa.

In the case of CLV control, due to such frequency change, it is not possible to continue the correction operation with the same calibration result in the whole range from the inner circumference to the outer circumference. In order to correctly perform the rotation correction in the whole range, the calibration must be periodically performed in conventional systems. However, when performing the calibration operation, the correction operation must be once stopped, so in the case of high-speed rotation, it is difficult to perform the calibration while maintaining stable operation.

Figure 4:
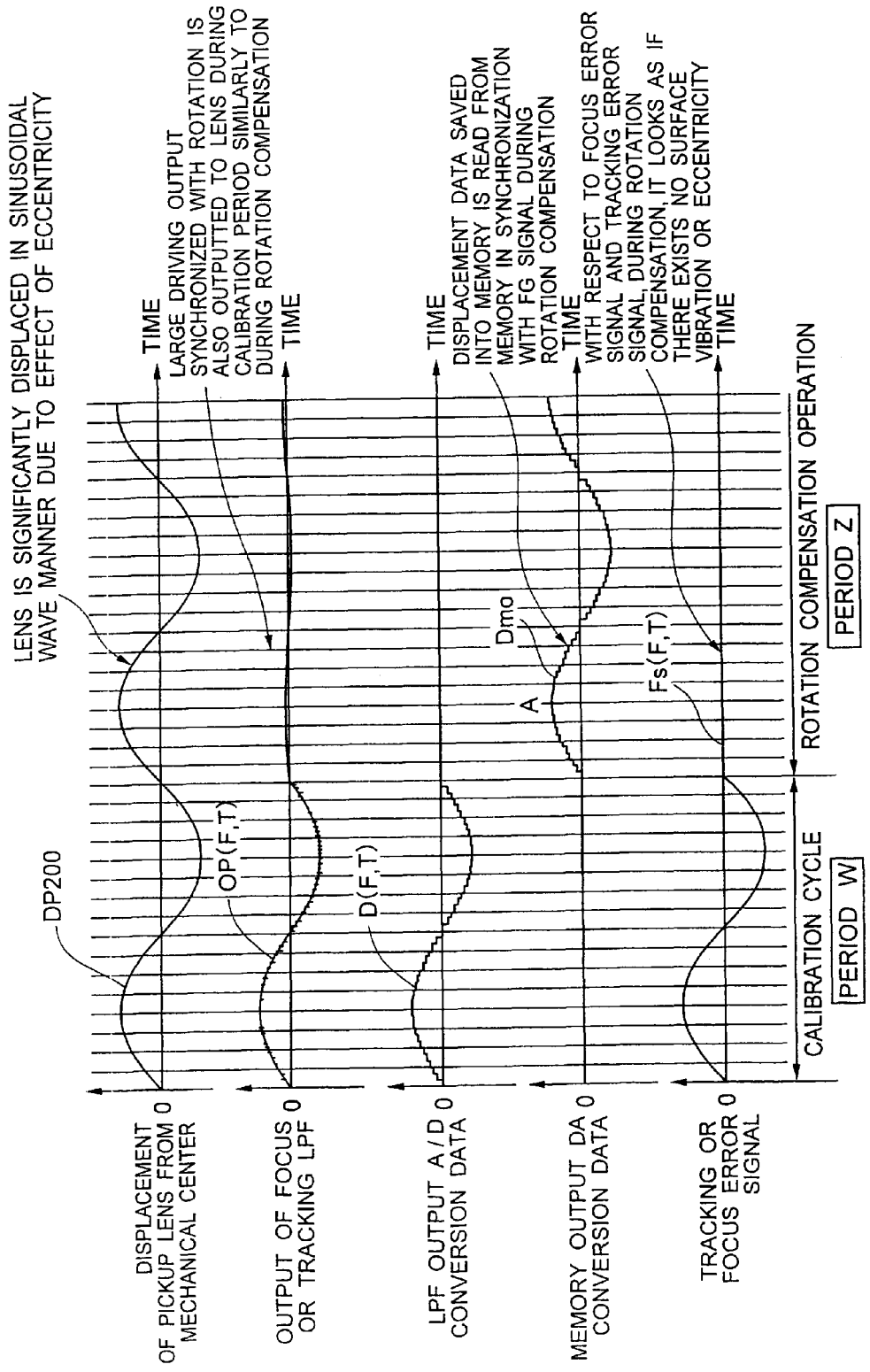
FIG. 4 is a diagram which explains a rotation correction operation by conventional optical disk apparatuses as a comparative example of the pickup control device shown in FIG. 1.

FIG. 4 is a diagram which explains a rotation correction operation by conventional optical disk apparatuses as a comparative example of the pickup control device 2 shown in FIG. 1. In FIG. 4, there are shown operation steps in a case where the eccentricity of optical disk is so large that the pickup lens is significantly dislocated from the mechanical center. Presently the double speed of the optical disk is typically 48 for CD-ROM and 16 for DVD-ROM, which is currently a general specification.

In the case of CD, the rotational frequency reaches a maximum rate in the outer circumference under the CAV control: 3 (Hz/1 double-speed)×48 (double-speed)=144 Hz, that is, 8640 rpm. In the case of DVD, the rotational frequency reaches a maximum rate in the outer circumference: 10 (Hz/1 double-speed)×16 (double-speed)=160 Hz, that is, 9600 rpm. In such high-speed rotation, the speed of beam spot irradiated on the optical disk relative to the optical disk during reproduction is considerably large.

Assuming that the amount of eccentricity is 50 µm at 16 double-speed of DVD, the relative speed between the lens and track reaches a maximum of 40 kHz in terms of tracking error signal frequency. The frequency band of tracking servo is generally 5 to 7 kHz at most. Therefore, once the tracking servo becomes unworkable at such maximum speed, the servo circuit cannot be restored to its normal operation. Noticeable vibrations of the pickup mechanism caused by the eccentricity of optical disk will also take place.

Referring to FIG. 4, waveform DP 200 representing the displacement of pickup lens from the mechanical center shows a state wherein the lens is significantly dislocated by eccentricity and/or surface vibration. Signal OP (F, T) is the output signal of the low-pass filter LPF of the tracking system or of the focus system during the ordinary servo control operation. The above filter output signal is used for following surface vibration and/or eccentricity; the lens position from the mechanical center is determined by this same signal. A signal obtained by converting the above signal OP (F, T) from analog to digital form is represented by waveform D (F, T).

In FIG. 4, there are shown two operation steps.

A first operation step is that of calibration cycle (period W). In this step, low-frequency component signals suppressed by the servo control capacity as a result of control by the tracking servo control circuit and/or focus servo control circuit are stored into the memory in synchronization with the rotation. In this step, the output signal of the DA converter is not added to the servo loop.

A second step is that of rotation compensation operation (period Z), which is the actual correction operation step. In this step, data has already been stored into the data memory. Data read out from the data memory is converted to analog signal by the DA converter and then added to the servo system. The signal waveforms of this step are represented by Dmo (DA converted data of the memory output) and Fs (F, T) (tracking or focus error signal) shown in FIG. 4. The tracking error signal indicates the center voltage during the addition process; due to the servo system control, it looks as if there exists no eccentricity and/or surface vibration.

As described above, however, with conventional control methods, the correction of surface vibration or eccentricity must be once stopped to perform the calibration operation again in order to correctly perform the rotation correction by CLV control.

Figure 5:
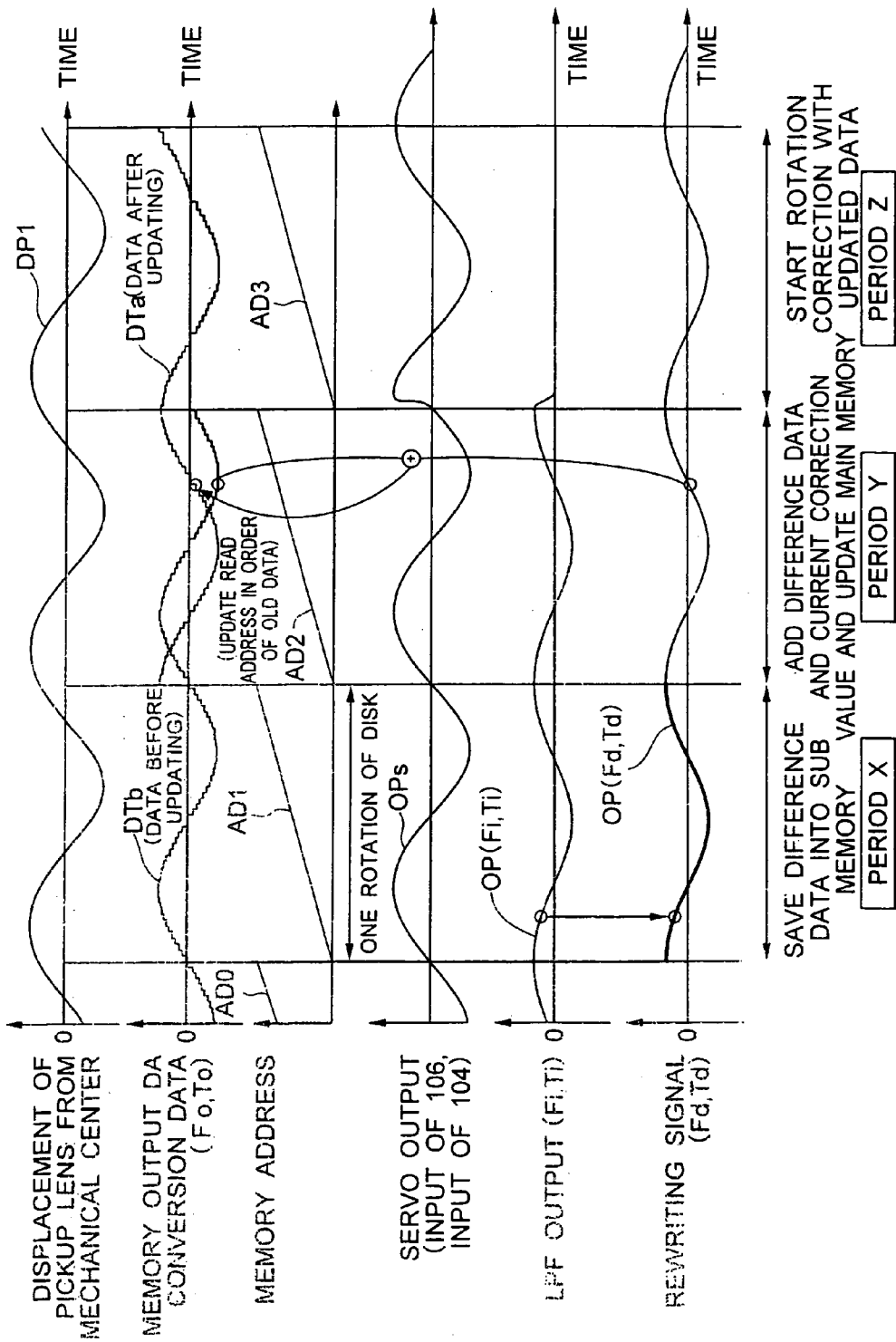
FIG. 5 is a diagram which explains the operation of the pickup control device shown in FIG. 1.

The operation of the pickup control device 2 according to the present embodiment will be described with reference to FIG. 5. In the drawing, there are shown multiple waveforms relative to a common time axis.

Similarly to DP 200 of FIG. 4, waveform DP1 representing the displacement of pickup lens from the mechanical center shows a state wherein the lens is significantly dislocated by eccentricity and/or surface vibration. Waveforms DTb and DTa of memory output DA conversion data (Fo, To) represent the output signal of the first surface vibration/eccentricity memory. Memory address values AD0 to AD3 represent the change of address values of the first memory MR1 and the second memory MR2. One rotation corresponds to one serrate waveform.

Waveform OP (Fi, Ti) represents the LPF output OP (Fi, Ti). In this drawing, there is shown a state wherein the rotational frequency of optical disk changes after the calibration is performed, whereby there occurs a difference between the actual eccentricity state and the phase of data read out from the first memory for correction. Consequently, although the LPF output OP (Fi, Ti) should be approximately "zero" when the correction is properly performed, it can be seen in FIG. 5 that some error occurs in period X and period Y.

In period X, the calibration using difference correction data according to the present embodiment starts. The switchover between the start and termination of the calibration and correction operation is performed at the position of memory address "0" in memory address values AD0 to AD3.

During period X, one cycle of the LPF output OP (Fi, Ti) is written into the second memory MR2. In this state, the correction of surface vibration and/or eccentricity need not be stopped.

During period Y, the output value of the first memory MR1 currently read out is added to that of the second memory MR2 stored in period X, by the adder 66; the resultant value is written again into the first memory MR1 as a writing signal (Fd, Td. When performing this writing, the memory data must be sequentially updated in order of old data after outputting the previously written data. Specifically, after the previous data is read out from one address, a newly calculated data is written.

Subsequently, at the time when period Y elapses, values corrected by use of the output OP (Fi, Ti) of LPF 24ba and LPF 28ba are stored in the first memory MR1. Thus, when period Z starts, the correction of surface vibration and/or eccentricity is performed by use of an updated correction output. Consequently, when period Z starts, the output OP (Fi, Ti) of LPF 24ba and LPF 28ba turns to "zero" again.

Accordingly, as may be seen from the relationship between output waveforms DP1 and DTb and between output waveforms DP1 and DTa, the operation is changed to a state that the phase of correction output coincides with that of surface vibration and/or eccentricity output.

In the case of CLV control operation, by performing periodically the above described difference calibration operation during sequential read and write from the inner circumference to the outer circumference, it is possible to improve the quality of the servo system following operation. If the interval of the periodic calibration is reduced, the difference between data DTb (before updating) and DTa (after updating) is also reduced in period Y of FIG. 5, thus making it possible to implement a smooth data updating operation.

As the interval of the difference calibration operation, for example, an interval predetermined by the timer TM incorporated in the system controller 38 may be used. Alternatively, while the address on the optical disk is monitored, for example, the system controller 38 may send a trigger signal for the difference calibration operation. Still alternatively, the output OP (Fi, Ti) of LPF 24ba and LPF 28ba is monitored, and when its value exceeds a threshold value, the trigger may be sent.

(2) Second Embodiment

Figure 6:
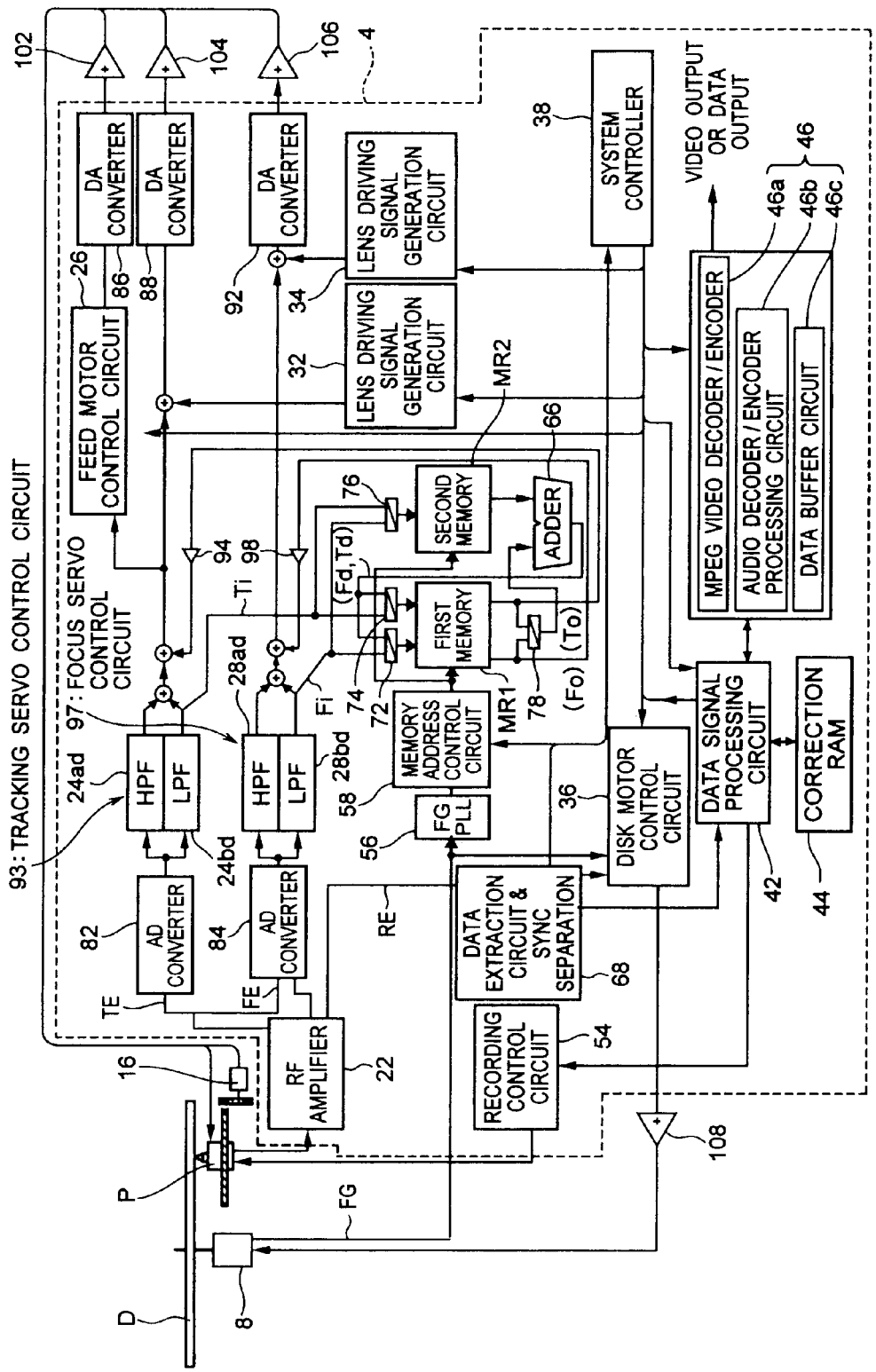
FIG. 6 is a block diagram schematically showing a configuration of an optical disk apparatus comprising a second embodiment of a pickup control device according to the present invention.

FIG. 6 is a block diagram schematically showing a configuration of an optical disk apparatus comprising a second embodiment of a pickup control device according to the present invention. A first feature of the optical disk apparatus 4 shown in FIG. 6 is that it comprises a pickup control device whose servo system is composed of a digital circuit. Signal TE is converted from analog to digital form by an AD converter 82; the rear-stage circuits are all composed of a digital signal processing circuit. Similarly, signal FE is also converted from analog to digital form by an AD converter 84 and then subject to a digital signal processing. After being digitally processed in each servo system, signal FE of the tracking servo system and signal TE of the focus servo system are converted to analog form by DA converters 86, 88 and 92, respectively; the converters are positioned at the preceding stage of a motor driver 102 and actuator drivers 104 and 106, respectively.

Figure 7:
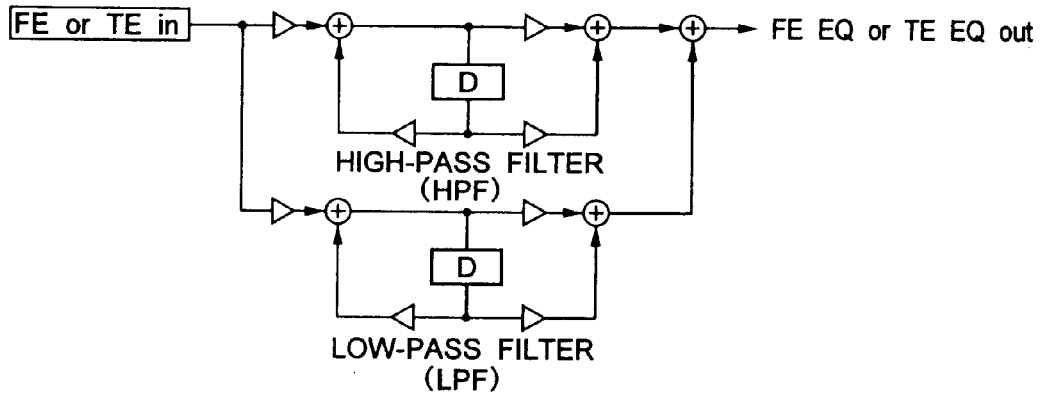
FIG. 7 is a diagram showing an example of a specific configuration of a tracking servo control circuit or focus servo control circuit contained in the pickup control device shown in FIG. 6.

An example of a specific configuration of the tracking servo control circuit 93 or focus servo control circuit 97 contained in the pickup control device 2 shown in FIG. 6 is shown in FIG. 7.

A second feature of the optical disk apparatus according to the present embodiment is that the focus system and tracking system do not have separately the second memory MR2 connected in parallel with the first memory MR1; the second memory MR2 is used alternately by the focus system and tracking system. Thus selectors 72, 74, 76 and 78 are provided; a switchover between the focus system and tracking system is performed by use of the selectors. With each of the first and second embodiments, in order to perform the difference correction operation, in addition to the first memory, the second memory is needed for saving the difference correction data. When the difference correction is performed simultaneously in the focus system and tracking system, the second memory MR2 according to the first embodiment described above requires the same storage capacity as the first memory MR1.

In practice, however, when the difference correction operation is performed, the calibration is performed while the correction of surface vibration and/or eccentricity is under way, so the difference correction need not be performed simultaneously in the focus system and tracking system.

Accordingly, with the present embodiment, when the difference calibration is performed, the operation time of the focus system and that of the tracking system are staggered with respect to the second memory MR2 by use of the switching operation of the selectors 72, 74, 76 and 78, whereby the storage capacity of the second memory can be reduced to half that of the first memory MR1.

Figure 8:
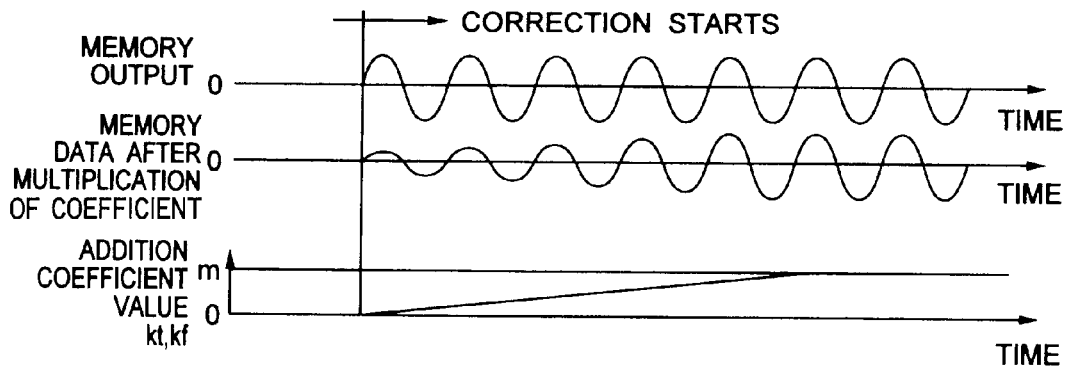
FIG. 8 is a diagram which explains the operation of variable coefficient multipliers contained in the pickup control device shown in FIG. 6.

With the present embodiment, since the servo system is composed of digital signal processing circuits, variable coefficient multipliers 94 and 98 are provided instead of the switches 24c and 28c of FIG. 1. The operation of the variable coefficient multipliers 94 and 98 is shown in FIG. 8. Referring to FIG. 8, as a time elapses after the start of correction, the waveform of memory data multiplied by the coefficient gradually comes close to that of the memory output data. From this, it can be seen that data for correcting surface vibration and/or eccentricity is little by little added.

What is claimed is:

1. A pickup control device comprising:
   a circuit which processes a first signal for error control to generate a servo control signal, the first signal being read from an optical disk;
   a clock signal generator which generates a clock signal synchronized with a rotation of the optical disk;
   a first memory and a second memory each of which is controlled by use of the clock signal synchronized with the rotation of the optical disk generated by the clock signal generator and stores one of a frequency component contained in the first signal and a rotational frequency component contained in the first signal, the frequency component being equal to or lower than a predetermined frequency;
   a first adder which adds data from the first memory to the first signal;
   a second adder which, in synchronization with the clock signal, retrieves data from the first memory and the second memory and accumulates those data to generate a second signal; and
   a difference correction data generating part which controls generation of a difference correction data in response to a change in a rotational frequency of the optical disk by, in a first period in synchronization with the clock signal, writing a current data on one of the frequency component and the rotational frequency component into the second memory, in a second period that is synchronized with the clock signal and is subsequent to the first period, reading out past data stored in the first memory to supply the read past data to the second adder, and writing again into the first memory the second signal generated by the second adder to update past data stored in the first memory as the difference correction data, and which, in a third period that is synchronized with the clock signal and is subsequent to the second period, reads out the difference correction data from the first memory to supply the difference correction data to the first adder.

2. The pickup control device according to claim 1, wherein only the rotational frequency component is stored in the first memory and the second memory.

3. The pickup control device according to claim 1, which further comprises:
   a controller which monitors an amplitude of the first signal and causes the difference correction data generating part unit to begin to operate when the amplitude exceeds a predetermined threshold value.

4. The pickup control device according to claim 1, which further comprises:
a controller which includes a counter to count the clock signal and causes the difference correction data generating part to begin to operate when a count value exceeds a predetermined value.

5. The pickup control device according to claim 1, which further comprises:
a controller which, based on an address on the optical disk, causes the difference correction data generating part to begin to operate.

6. The pickup control device according to claim 1, further comprising:
a tracking servo system which generates a tracking servo control signal; and
a focus servo system which generates a focus servo control signal, wherein
the difference correction data generating part further includes a selector which selects one of the tracking servo control signal and the focus servo control signal so that data for the tracking servo control signal and data for the focus servo control signal are stored into the second memory alternately to each other.

7. The pickup control device according to claim 6, wherein the tracking servo system and the focus servo system are composed of a digital circuit.

8. The pickup control device according to claim 1,
wherein each of the first memory and the second memory stores, in synchronization with the clock signal, one of the frequency component in the first signal and the rotational frequency component in the first signal in synchronization with rotation of the disk.

9. An optical disk apparatus comprising:
a motor which rotates an optical disk;
an optical pickup which records information on the optical disk by radiating light on the rotating optical disk and reads information recorded on the optical disk from reflected light coming from the optical disk;
a pickup control device which includes a circuit which generates a servo control signal based on a first signal for error control that is read from the optical disk and controls the optical pickup; and
an optical pickup driver which adjusts a relative position between the optical pickup and optical disk based on the servo control signal;
the pickup control device further including:
a clock signal generator which generates a clock signal synchronized with a rotation of the optical disk;
a first memory and a second memory each of which is controlled by use of the clock signal synchronized with the rotation of the optical disk generated by the clock signal generator and stores one of a frequency component contained in the first signal and a rotational frequency component contained in the first signal, the frequency component being equal to or lower than a predetermined frequency;
a first adder which adds data from the first memory to the first signal;
a second adder which, in synchronization with the clock signal, retrieves data from the first memory and the second memory and accumulates those data to generate a second signal; and
a difference correction data generating part which controls generation of a difference correction data in response to a change in a rotational frequency of the optical disk by, in a first period in synchronization with the clock signal, writing a current data on one of the frequency component and the rotational frequency component into the second memory, in a second period that is synchronized with the clock signal and is subsequent to the first period, reading out past data stored in the first memory to supply the read past data to the second adder, and writing into the first memory the second signal generated by the second adder to update past data stored in the first memory as the difference correction data, and which, in a third period that is synchronized with the clock signal and is subsequent to the second period, reads out the difference correction data from the first memory to supply the difference correction data to the first adder.

10. The optical disk apparatus according to claim 9, wherein only the rotational frequency component is stored in the first memory and the second memory.

11. The optical disk apparatus according to claim 9, wherein the pickup control device further comprises:
a controller which monitors an amplitude of the first signal and causes the difference correction data generating part unit to begin to operate when the amplitude exceeds a predetermined threshold value.

12. The optical disk apparatus according to claim 9, wherein the pickup control device further comprises:
a controller which has a counter to count the clock signal and causes the difference correction data generating part unit to begin to operate when a count value exceeds a predetermined value.

13. The optical disk apparatus according to claim 9, wherein the pickup control device further comprises:
a controller which, based on an address on the optical disk, causes the difference correction data generating part to begin to operate.

14. The optical disk apparatus according to claim 9, further comprising:
a tracking servo system which generates a tracking servo control signal; and
a focus servo system which generates a focus servo control signal, wherein
the correction unit further has a selector which selects one of the tracking servo control signal and the focus servo control signal so that data for the tracking servo control signal and data for the focus servo control signal are stored into the second memory alternately to each other.

15. The optical disk apparatus according to claim 14, wherein the tracking servo system and the focus servo system are composed of a digital circuit.

16. The optical disk apparatus according to claim 9,
wherein each of the first memory and the second memory stores, in synchronization with the clock signal, one of the frequency component in the first signal and the rotational frequency component in the first signal in synchronization with rotation of the disk.

17. A pickup control method for use in an optical disk apparatus which performs recording and reproduction of an optical disk, the optical disk apparatus having a first memory and a second memory, the pickup control method comprising:
generating a clock signal synchronized with a rotation of the optical disk;
storing one of a frequency component contained in a first signal for error control and a rotational frequency component contained in the first signal into the first memory and the second memory, respectively, the first signal being read from the optical disk, the frequency component being equal to or lower than a predetermined frequency, each of the first and second memories being controlled by use of the clock signal synchronized with the rotation of the optical disk;

retrieving data from the first memory and the second memory and accumulating those data in synchronization with the clock signal to generate a second signal;

generating a difference correction data in response to a change in a rotational frequency of the optical disk by, in a first period in synchronization with the clock signal, writing a current data on one of the frequency component and the rotational frequency component into the second memory, in a second period that is synchronized with the clock signal and is subsequent to the first period, reading out past data stored in the first memory and writing again into the first memory the second signal to update past data stored in the first memory into the difference correction data; and in a third period that is synchronized with the clock signal and is subsequent to the second period, reading out the difference correction data from the first memory and adding the difference correction data to the first signal to generate a servo control signal by processing the first signal to which the difference correction data is added.

18. The pickup control method according to claim 17, wherein only the rotational frequency component is stored in the first memory and the second memory.

19. The pickup control method according to claim 17, wherein the first period starts when an amplitude of the first signal monitored exceeds a predetermined threshold value.

20. The pickup control method according to claim 17, further comprising:

counting the clock signal, wherein the first period starts when a count value exceeds a predetermined value.

21. The pickup control method according to claim 17, wherein the first period starts based on an address on the optical disk.

22. The pickup control method according to claim 17, wherein the optical disk apparatus comprises:

a tracking servo system which generates a tracking servo control signal; and a focus servo system which generates a focus servo control signal, and the pickup control method further comprises:

storing one of data for the tracking servo control signal and data for the focus servo control signal alternatively to each other into the second memory.

23. The pickup control method according to claim 17, wherein one of the frequency component in the first signal and the rotational frequency component in the first signal is stored into the first memory and the second memory, respectively, in synchronization with rotation of the disk.

* * * * *